United States Patent

[11] 3,616,248

| [72] | Inventors | Ulrich Behrens<br>Leipzig;<br>Manfred Ringpfeil, Holzhausen; Anton Gabert; Dieter Pohland; Karl Sattler, Leipzig; Manfred Rudel, Markkleeberg, Germany; Vladimir Munk; Jiri Jiricka, Prague, Czechoslovakia |
|---|---|---|
| [21] | Appl. No. | 695,552 |
| [22] | Filed | Jan. 4, 1968 |
| [45] | Patented | Oct. 26, 1971 |
| [73] | Assignee | Deutsche Akademie der Wissenschaften zu Berlin<br>Berlin, Germany |

[54] PROCESS FOR THE SEPARATION OF YEAST FROM YEAST-OIL-WATER EMULSIONS
14 Claims, No Drawings

[52] U.S. Cl. .................................................... 195/82, 195/28 R
[51] Int. Cl. ....................................................... C12c 11/24
[50] Field of Search .......................................... 195/82, 2, 3, 3 H, 28; 99/96

[56] References Cited
UNITED STATES PATENTS

| 3,186,922 | 6/1965 | Champagnat ............... | 195/82 |
| 3,288,213 | 11/1966 | King et al ..................... | 166/274 |
| 3,323,588 | 6/1967 | Rai et al ........................ | 166/273 |

*Primary Examiner*—A. Louis Monacell
*Assistant Examiner*—Seymour Rand
*Attorney*—Michael S. Striker ABSTRACT: The yeasts in yeast-oil-water emulsions formed in the conversion of hydrocarbons to yeast are separated from the emulsion by adding one of the following two-component combinations of surface-active agents to the emulsion prior to the separation step:

1. polyphenolethyleneoxide-adduct (containing about 16 mols of ethyleneoxide per mol of polyphenol) and olein-monoethanolamide.
2. polyphenolethyleneoxide-adduct and distillation-residue of the fatty acid distillation $C_{12}$ to $C_{18}$.
3. polyphenolethyleneoxide-adduct and hydroxyethylated sulfated fatty alcohol having a chain length between $C_{12}$ and $C_{18}$.
4. alkylmonosulfonate (mean chain length of about $C_{15}$) and laurylamidoethylpyridiniumchloride.
5. alkylmonosulfonate (mean chain length of about $C_{15}$) and the methosulfate of a quarternary fatty amine having a mean chain length of between $C_{15}$ and $C_{17}$.

The surface-active agents are used in an amount up to 1.5°/00, preferably below 1°/00, relative to the total emulsion.

PROCESS FOR THE SEPARATION OF YEAST FROM YEAST-OIL-WATER EMULSIONS

BACKGROUND OF THE INVENTION

In the conversion of hydrocarbons and products containing hydrocarbons to yeast, yeast-oil-water emulsions are obtained. It has long been a problem to separate the yeast from these highly stable emulsions, in particular from the oil components.

It has already been proposed to add surface-active agents to the emulsion for this purpose prior to the separation. These agents may be anionic or cationic active substances or also saccharose esters which latter may be left in the mass in some of the cases. The separation of the emulsion is then effected in an aqueous solution by either treating the entire fermentation mass or, more advantageously, by treating only the emulsion which has been separated out previously. The surface-active agents are usually used in these processes in an amount corresponding to between 0.2 and 5 percent of the fermentation solution. The usual recommendation was to effect the alkalination of the mixture to a pH between 7 and 9. Likewise, a temperature increase up to 99° C. was considered advantageous.

Significantly, this kind of preparation requires a repeated washing and separation until the desired degree of separation is obtained. The cycle must be repeated more often if a relatively small amount of separation aids is used. Thus there is necessary in this process a comparatively high specific amount of surface-active agents. As a result there are necessary additional operational steps to remove or at least to reduce the contents in the mass of these agents among others, also for the reason to recover the separating agents for reuse. Otherwise, the separation of the emulsion requires a large number of steps before the different phases have the desired degree of purity.

SUMMARY OF THE INVENTION

It is therefore an object of this invention to accomplish an efficient separation of the yeast from the yeast-oil-water emulsion and in particular from the oil components.

It is a further object to accomplish this separation without an unreasonably high amount of surface-active agents.

It is a further object of the invention to permit the separation without requiring multiple repetitions of the individual separation steps.

These objects are accomplished by adding to the emulsion of yeast-oil-water a two-component combination of surface-active agents prior to the separation. The two-component combination may be one of the following:

1. polyphenolethyleneoxie-adduct (containing about 16 mols of ethyleneoxide per mol of polyphenol) and oleinmonoethanolamide
2. polyphenolethyleneoxide-adduct and distillation-residue of the fatty acid distllation $C_{12}$ to $C_{18}$
3. polyphenolethyleneoxide-adduct and hydroxyethylated sulfated fatty alcohol having a chain length between $C_{12}$ and $C_{18}$
4. alkylmonosulfonate (mean chain length of about $C_{15}$) and laurylamidoethylpyridiniumchloride
5. alkylmonosulfonate (mean chain length of about $C_{15}$) and the methosulfate of a quarternary fatty amine having a mean chain length of between $C_{15}$ and $C_{17}$.

DESCRIPTION OF THE PREFERRED EMBODIMENTS

As has been stated, the separation according to the present invention is effected by adding to the emulsion prior to separation either different nonionic surface active agents or by adding specific anionic and cationic surface-active agents.

It has in particular been found that the above-listed five combinations of two-component surface-active agents are suitable for the purposes of the invention. The surface-active agents are added in an amount up to 1.5 °/00, preferably below 1 °/00, relative to the emulsion to be separated.

It has been found that, preferably, the pH value of the emulsion is left at its initial range as it exists from the conversion process. This is a pH between 3 and 4. Any modification into the neutral or alkaline range leads to a deterioration of the demulsifying action of the combination.

The following technique may be observed for the operation. During the conversion of the hydrocarbon to yeast, a separation occurs under influence of gravity or in a centrifugal operation into an aqueous lower phase and a creamy emulsion phase. Virtually all of the yeast components of the fermentation solution are found in the emulsion phase together with a corresponding amount of water and of unreacted hydrocarbon. Depending on the yeast and oil content, the emulsion has a more or less pronounced creamy character. To this emulsion there is added at first only one component of the two-component combination. This component is thoroughly mixed with the emulsion. Thereafter the second component is added and mixed into the emulsion. The mixture, which now has a substantially reduced viscosity compared with the initial emulsion, is then passed to the separation. The temperature of the mixture subject to the separation should not be in excess of 40° C. if the combination of surface-active agents involves a cationic and an anionic substance. If nonionic surface-active agents are used, it is preferable to increase the temperature, for instance to between 40° and 60° C.

The use of the combination of surface-active agents of the present invention permits a more or less quantitative separation of the emulsion into yeast-water and oil.

The following examples illustrate the invention but should not be interpreted as limiting its scope. The symbol °/oo stands for "per mill."

EXAMPLE I 100 g. of a yeast-oil-water emulsion are reacted and thoroughly mixed with 0.25 °/oo of a polyphenolethyleneoxide-adduct in the form of a 1 percent aqueous solution. 0.5 °/oo of oleinmonoethanolamide are thereafter added and mixed into the emulsion. The mixture is heated for half an hour to a temperature of 40° C. and then subjected to centrifuging for 5 minutes at 3,000 r.p.m. Separation into yeast/water/oil is thus effected.

EXAMPLE II 100 g. of a yeast-oil-water emulsion are mixed with 0.1 °/oo of polyphenolethyleneoxide-adduct as a 1 percent aqueous solution. There is then added 1 °/oo of the distillation-residue of a fatty acid distillation of acids with a mean chain length $C_{12}$ to $C_{18}$. The mixture is warmed for half an hour to 60° C. and subsequently centrifuged for 5 minutes at 2,000 r.p.m. Separation into yeast/water/oil is effected.

EXAMPLE III 100 g. of a yeast-oil-water emulsion are mixed with 0.1 °/oo of polyphenolethyleneoxide-adduct as a 1 percent aqueous solution and are then reacted with 0.25 °/oo of a hydroxyethylated sulfated fatty alcohol of a mean chain length $C_{12}$ to $C_{18}$ in the form of a 1 percent aqueous solution. The emulsion is thoroughly mixed with the additives and warmed up for half an hour to 40° C., followed by centrifuging. A separation into yeast/water/oil is effected.

EXAMPLE IV 100 g. of a yeast-oil-water emulsion are reacted with 0.27 °/oo of laurylamidoethylpyridiniumchloride as a 1 percent aqueous solution and the total is subjected to thorough mixing. Thereafter 0.6 °/oo of alkylmonosulfonate (mean chain length $C_{15}$) are added in the form of a 1 percent aqueous solution, followed by renewed mixing and thereafter centrifuging at room temperature. Separation is effected into yeast/water/oil.

EXAMPLE V 100 g. of a yeast-oil-water emulsion are reacted and thoroughly mixed with 0.4 °/oo of the methosulfate of a quarternary fatty amine (mean chain length $C_{15}$ to $C_{17}$) in the form of a 1 percent aqueous solution. Thereafter 0.6 °/oo of alkylmonosulfonate (mean chain length $C_{15}$), which likewise is in the form of a 1 percent aqueous solution, are added and are centrifuged at room temperature. Separation is effected into yeast/water/oil.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

1. A process for the separation of yeast from a yeast-oil-water emulsion, comprising adding to the emulsion a combination of two surface-active agents selected from the following:

polyphenolethyleneoxide-adduct (containing about 16 mols of ethyleneoxide per mol of polyphenol) and oleinmonoethanolamide;

polyphenolethyleneoxide-adduct and distillation residue of the fatty acid distillation $C_{12}$ to $C_{18}$;

polyphenolethyleneoxide-adduct and hydroxyethylated sulfated fatty alcohol having a chain length between $C_{12}$ and $C_{18}$;

alkylmonosulfonate (mean chain length of about $C_{15}$) and laurylamidoethylpyridiniumchloride; and alkylmonosulfonate (mean chain length of about $C_{15}$) and the methosulfate of a quaternary fatty amine having a mean chain length of between $C_{15}$ and $C_{17}$, the amount of said agents being up to about 1.5 per mil of the total emulsion; and thereafter effecting the separation of the emulsion at an acid pH.

2. The process of claim 1 wherein the two surface-active agents are nonionic compounds.

3. The process of claim 1 wherein one of the surface-active agents is a nonionic compound and the other is an anionic compound.

4. The process of claim 1 wherein one of the surface-active agents is a cationic compound and the other is an anionic compound.

5. The process of claim 1 wherein the combination of surface-active agents comprises a polyphenolethyleneoxide-adduct and a member of the group consisting of oleinmonoethanolamide, the distillation-residue from the distillation of fatty acids having a mean chain length $C_{12}$ to $C_{18}$ and a hydroxyethylated sulfated fatty alcohol having a mean chain length from $C_{12}$ to $C_{18}$.

6. The process of claim 1 wherein the combination of surface-active agents comprises an alkylmonosulfonate of a mean chain length of about $C_15$ and a compound selected from the group consisting of laurylamidoethylpyridiniumchloride and the methosulfate of a quatenary fatty amine having a mean chain length of $C_{15}$ to $C_{17}$.

7. The process of claim 1 wherein the total amount of said additions is below 1°/oo of the total emulsion.

8. The process of claim 1 wherein the separation is effected at elevated temperatures.

9. The process of claim 1 wherein the separation is effected at a temperature between 40° and 60° C.

10. The process of claim 1 wherein the separation is effected at a temperature up to about 40° C.

11. The process of claim 1 wherein the two-component combination is added to the creamy emulsion phase as obtained in the conversion of hydrocarbons to yeast after separation of the mass into said creamy emulsion phase and a lower aqueous phase.

12. The process of claim 1 wherein the pH of the emulsion during the separation is left at its initial value existing from the conversion of the hydrocarbons to yeast.

13. The process of claim 1 wherein the pH during the separation is between 3 and 4.

14. The process of claim 1 wherein one component of the two-component combination of surface-active agents is first separately added to the emulsion and is thoroughly mixed therewith, whereupon the second component is added and thoroughly mixed with the emulsion followed by the separation of the emulsion.

* * * * *